(12) United States Patent
Hartmann et al.

(10) Patent No.: US 8,448,514 B2
(45) Date of Patent: May 28, 2013

(54) SENSING DEVICE WITH WHISKER ELEMENTS

(75) Inventors: Mitra J. Hartmann, Evanston, IL (US); Joseph H. Solomon, River Forest, IL (US)

(73) Assignee: Northwestern University, Evanston, IL (US)

( * ) Notice: Subject to any disclaimer, the term of this patent is extended or adjusted under 35 U.S.C. 154(b) by 334 days.

(21) Appl. No.: 12/803,761

(22) Filed: Jul. 6, 2010

(65) Prior Publication Data
US 2010/0324838 A1 Dec. 23, 2010

Related U.S. Application Data

(62) Division of application No. 11/906,751, filed on Oct. 3, 2007, now Pat. No. 7,774,951.

(60) Provisional application No. 60/849,400, filed on Oct. 4, 2006.

(51) Int. Cl.
*G01P 5/02* (2006.01)
*G01F 1/28* (2006.01)

(52) U.S. Cl.
USPC .............................................. 73/521; 73/861

(58) Field of Classification Search
USPC ............... 33/501, 548, 549, 551, 552, 553, 33/554, 555, 700, 832, 833, DIG. 13; 73/104, 73/105, 661, 272 R, 521, 861, 861.71, 861.77, 73/861.78, 861.85; 702/155, 158
See application file for complete search history.

(56) References Cited

U.S. PATENT DOCUMENTS

| | | | | |
|---|---|---|---|---|
| 4,625,565 A | * | 12/1986 | Wada et al. | 73/861.74 |
| 6,286,226 B1 | | 9/2001 | Jin | 33/706 |
| 7,210,544 B2 | | 5/2007 | Kamen et al. | 180/7.1 |
| 7,278,297 B2 | | 10/2007 | Bauza et al. | 73/105 |
| 7,924,040 B2 | * | 4/2011 | Forbes | 324/755.02 |

(Continued)

FOREIGN PATENT DOCUMENTS

| | | | |
|---|---|---|---|
| DE | 2557817 A | * | 6/1977 |
| DE | 29806374 U1 | * | 7/1998 |

(Continued)

OTHER PUBLICATIONS

T.N. Clements, C.D. Rahn, "Three-Dimensional Contact Imaging with an Actuated Whisker," IEEE Trans. Robot., vol. 22, No. 4, pp. 844-848, Aug. 2006.

(Continued)

*Primary Examiner* — R. A. Smith
(74) *Attorney, Agent, or Firm* — Klintworth & Rozenblat IP LLC (57) ABSTRACT

A sensing device includes an elongated whisker element having a flexible cantilever region and a base region where a change in moment or curvature is generated by bending of the cantilever region when it contacts an object. One or more sensor elements cooperatively associated with the whisker element provide one or more output signals that is/are representative of two orthogonal components of change in moment or curvature at the whisker base region to permit determination of object distance, fluid velocity profile, or object contour (shape) with accounting for lateral slip of the whisker element and frictional characteristics of the object. Multiple sensing devices can be arranged in arrays in a manner to sense object contour without or with adjustment for lateral slip.

6 Claims, 9 Drawing Sheets

U.S. PATENT DOCUMENTS

| | | | |
|---|---|---|---|
| 8,347,726 B2 * | 1/2013 | Kobayashi et al. | 73/777 |
| 2002/0084410 A1 | 7/2002 | Colbert et al. | 250/306 |
| 2004/0103740 A1 | 6/2004 | Townsend et al. | 47/490.01 |
| 2008/0202222 A1 | 8/2008 | Woody et al. | 73/105 |
| 2008/0229839 A1 * | 9/2008 | Chakraborty | 73/724 |
| 2008/0264185 A1 | 10/2008 | Kobayashi et al. | 73/862.637 |
| 2009/0113739 A1 | 5/2009 | Lu | 33/836 |
| 2009/0288479 A1 * | 11/2009 | Woody et al. | 73/105 |
| 2011/0223412 A1 * | 9/2011 | Cornelius et al. | 428/323 |

FOREIGN PATENT DOCUMENTS

| | | | |
|---|---|---|---|
| DE | 10308051 A1 * | 9/2004 | |
| DE | 102005051785 A1 * | 5/2007 | |
| JP | 06241852 A * | 9/1994 | |
| JP | 02002116101 A | 4/2002 | |
| JP | 2003287451 A * | 10/2003 | |
| JP | 2005172506 A * | 6/2005 | |

OTHER PUBLICATIONS

M. Fend, S. Bovet, H. Yokoi, and R. Pfeifer, "An Active Artificial Whisker Array for Texture Discrimination," in Proc. IEEE/RSJ Int. Conf. on Intel. Robots and Systems, pp. 1044-1049, 2003.

M. Fend, H. Yokoi and R. Pfeifer, "Optimal Morphology of a Biologically-Inspired Whisker Array on an Obstacle-Avoiding Robot," in Proc. Of the 7th Eur. Conf. on Artificial Life, pp. 771-780, 2003.

J. Hipp, E. Arabzadeh, E. Zorzin, J. Conradt, C. Kayser, M.E. Diamond and P. König, "Texture Signals in Whisker Vibrations," J. Neurosci., vol. 95, No. 3, pp. 1792-1799, 2006.

S. Hirose, S. Inoue and K. Yoneda, "The Whisker Sensor and the Transmission of Multiple Sensor Signals," Advanced Robotics, vol. 4, No. 2, pp. 105-117, 1990.

D. Jung and A. Zelinski, "Whisker Based Mobile Robot Navigation," in Proc. IEEE/RJS Int. Conf. on Intelligent Robots and Systems, vol. 2, pp. 444-449, 1996.

M. Kaneko and T. Tsuji, "A Whisker Tracing Sensor with 5 μm Sensitivity," in Proc. IEEE Int. Conf. on Robotics and Automation, pp. 3907-3912, 2000.

M. Kaneko, N. Kanayama and T. Tsuji, "Active Antenna for Contact Sensing," IEEE Trans. On Robotics and Automation, vol. 14, No. 2, pp. 278-291, Apr. 1998.

M. Kaneko, N. Kanayama and T. Tsuji, "Vision-Based Active Sensor Using a Flexible Beam," IEEE/ASME Trans. On Mechan., vol. 6, No. 1, pp. 7-16, Mar. 2001.

R.A. Russell and J.A. Wijaya, "Object Location and Recognition Using Whisker Sensors," Australian Conference on Robotics and Automation, CD-ROM Proceedings ISBN 0-9587583-5-2, 2003.

R.A. Russell, "Using Tactile Whiskers to Measure Surface Contours," in Proc. IEEE Inter. Conf. on Robotics and Automation, pp. 1295-1299, May 1992.

G. Scholz and C. Rahn, "Profile Sensing with an Actuated Whisker," IEEE Trans. On Robotics and Automation, vol. 20, No. 1, pp. 124-127, 2004.

A. Schultz, J. Solomon, M. Peshkin, and M. Hartmann, "Multifunctional Whisker Arrays for Distance Detection, Terrain Mapping, and Object Feature Extraction," in Proc. IEEE Inter. Conf. on Robotics and Automation, pp. 2588-2593, 2005.

T. Tsujimura and T. Yabuta, "Object Detection by Tactile Sensing Method Employing Force/Torque Information," IEEE Trans. On Robotics and Automation, vol. 5, No. 4, pp. 444-450, 1989.

N. Ueno, M. Svinin, and M. Kaneko, "Dynamic Contact Sensing by Flexible Beam," IEEE/ASME Transactions on Mechatronics, vol. 3, No. 4, pp. 254-264, 1998.

J. Wilson and Z. Chen, "A Whisker Probe System for Shape Perception of Solids," Transactions of the ASME, vol. 117, pp. 104-108, Mar. 1995.

H. Yokoi, M. Fend and R. Pfeifer, "Development of a Whisker Sensor System and Simulation of Active Whisking for Agent Navigation," in Proc. IEEE/RSJ Inter. Conf. on Intelligent Robots and Systems, pp. 607-612, 2004.

D. Kim and R. Möller, "Biomimetic whiskers for shape recognition", available online Sep. 18, 2006, ScienceDirect, Robotics and Autonomous Systems 55 (2007), pp. 235, 238-240, 242.

\* cited by examiner

FIG. 9

SENSING DEVICE WITH WHISKER ELEMENTS

This application is a division of U.S. application Ser. No. 11/906,751 filed Oct. 3, 2007, now U.S. Pat. No. 7,774,951, claims benefits and priority of provisional application Ser. No. 60/849,400 filed Oct. 4, 2006, the disclosure of which is incorporated herein by reference.

CONTRACTUAL ORIGIN OF THE INVENTION

This invention was made with government support under Grant No. IOB0446391 awarded by the National Science Foundation and Grant No. 1261628/NAS-03001 awarded by the National Aeronautics and Space Administration (NASA) through the Jet Propulsion Laboratory. The government has certain rights in the invention.

FIELD OF THE INVENTION

The invention relates to sensing methods and devices that include one or more whisker sensing elements for detecting, sensing, measuring or quantifying object distances, contours and fluid flow profiles.

BACKGROUND OF THE INVENTION

Facial and body whiskers serve as a remarkably sensitive source of tactile information for many species of mammals. For example, harbor seals can use their facial whiskers to track hydrodynamic trails, an ability thought to aid long-distance prey tracking (Dehnhardt et al. 2001). As another example, behavioral experiments on rats have shown that individual whiskers provide the fine-grained distance discrimination sensitivity needed to sense aperture width (Krupa et al. 2001). Increased study of the biological function of whiskers has been paralleled by an increasing interest in constructing their robotic counterparts (see references). Robotic whisker arrays could be used in a wide variety of applications, ranging from fine sensing tasks that push the limits of tactile discrimination and hence require engineers to construct systems that rival animals' exquisite tactile sensitivity, to obstacle-avoidance tasks that require only far coarser sensing capabilities.

The simplest types of artificial whiskers are those which are used as binary contact detection sensors. These have been used on several successful toys (e.g. "BioBugs" made by WowWee/Hasbro). Other researchers have explored the use of whiskers for wall-following and to characterize surface texture and surface defects. Most recently, a whisker sensor was designed for precise three-dimensional measurement of heart position in robot assisted beating heart surgery.

An important feature of biological whiskers is their ability to extract three-dimensional (3D) features, either of solid objects or of fluid flows. However, few studies have investigated how this capability might be replicated in an artificial whisker array. One of the most successful approaches towards 3D feature extraction was taken by Kaneko et al., in IEEE, Trans. Robotic Autom, 14, 278-29 (1998). These authors employ a method in which a flexible beam is rotated a small amount ("tapped") against an object while measuring bending moment at the base of the beam (whisker) to determine contact distance based on the rotational compliance. However, this method has serious drawbacks: it requires multiple adjustments of actuator orientation to keep the beam oriented perpendicular to the object, to avoid lateral slip, and also requires multiple rotations for each radial distance extraction. These are not only awkward in practice, but also infeasible when arrays of multiple whiskers are employed to contact the object.

There are two interrelated problems that have as yet prevented artificial whiskers from being used in large, highly parallel, actuated arrays to sense object features. The first problem, as mentioned above, is lateral slip, in which the whisker slides out of its primary plane of rotation. The second problem is closely related to lateral slip, and involves the need to obtain a reasonable estimate of the coefficient of friction. The invention described herein is advantageous to overcome these problems and to provide and the ability to quantify and passively accommodate for lateral slip of a moving whisker in the presence of friction.

SUMMARY OF THE INVENTION

An embodiment of the invention provides a sensing method that involves relatively moving an elongated whisker element having a deflectable cantilever region, and an object so that the cantilever region bends as a result of contact with the object, and determining two orthogonal components of a change in a whisker bending parameter such as, for example, a change in moment exerted at a base region of the whisker element, or a change in curvature at the base region of the whisker element, as a result of the bending wherein the method further includes estimation of object distance (contact point distance) by accounting for lateral slip of the whisker element. The estimate of contact point distance is adjusted by a factor related to the object surface slope relative to the plane of movement of the whisker, and frictional properties of the object/whisker contact surface. An array of multiple whisker elements and the object can be relatively moved in practice of the invention.

A sensing apparatus pursuant to an embodiment of the invention includes a sensing device having an elongated whisker element with a flexible cantilever region and a base region where a moment is generated by deflection of the cantilever region, and one or more sensor elements cooperatively associated with the whisker element to provide one or more output signals that is/are representative of two orthogonal components of a change in a whisker bending parameter (e.g. change in moment or change in curvature) exerted at the whisker base region. The output(s) of the one or more sensing elements is/are input to a computer device having an algorithm which uses the values of the two measured orthogonal components of change in moment or change in curvature to estimate object distance by accounting for lateral slip of the whisker element along the object without any need to physically reorient the whisker element or the object or to sense force. Multiple sensing devices can be arranged in arrays in a manner to sense distance or velocity profiles or object shapes.

In a particular embodiment, the base region of the whisker element is mounted on a mounting body. One or more sensor elements is/are mounted on the mounting body in manner to sense change in moment or change in curvature at the base region from forces acting on the flexible region of the whisker and transmitted to the mounting body. Preferably, multiple sensor elements are disposed on the mounting base to provide one or more output signals that are representative of two orthogonal components of change in whisker moment or whisker curvature exerted at the whisker base region from bending of the whisker.

Certain apparatus embodiments and method embodiments of the invention are practiced in a so-called tapping mode where the whisker element is moved (rotated and/or translated) through a small displacement against an object to determine initial contact distance.

Certain further system embodiments and method embodiments of the invention are practiced to detect fluid flow profiles.

Other features and advantages of the invention will become apparent form the following description taken with the following drawings.

DESCRIPTION OF THE INVENTION

Figure 1:
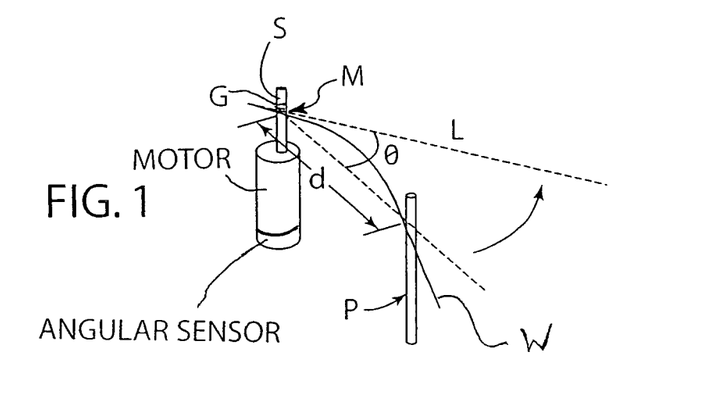
FIG. 1 is a schematic view of sensing device having a whisker element rotated by motor against an object (peg).

Classical elasticity theory was used to model the whisker element W as a cylindrical beam bending against a rigid, motionless object (shown as peg P) and to derive the monotonic relationship between radial contact distance d, the pushing angle θ and moment M (torque) at the whisker base (see FIG. 1). Through either rotation or translation (or a combination of these motions) of the whisker at or near the base region thereof (where the moment sensor resides) against an object, the initial point that the whisker touches along the object during the whisker's movement can be computed as described in the APPENDIX. The derivation can alternately be conducted in terms of force instead of moment, and/or translation instead of rotation. Although the invention is described in detail immediately below with respect determining a change in moment at the base region of the whisker element as a result of bending, this is offered for purposes of illustration and not limitation since the invention is not so limited and can be practiced by determining a change in curvature or other deflection of the whisker element at the base region (or other region) as explained later below. The invention envisions moving the whisker element, or the object, or both to provide relative motion there between.

From the APPENDIX, equation 2 shows that a motor rotating a cylindrical beam against a point object will experience a torque proportional to the amount it is rotated (for small values of θ) if there is no lateral slip. In other words, the beam acts as a torsional spring, with an effective spring constant inversely proportional to object distance d. Kaneko et al. in IEEE, Trans. Robotic Autom, 14, 278-29 (1998) reported such a proportionality. As described above, however, the reported method of Kaneko et al. is disadvantageous in that this method requires adjustment of actuator orientation over multiple whisks to orient the whisker oriented perpendicular to the object being sensed and avoid lateral slip.

An illustrative embodiment of the present invention provides a sensing device that can provide appropriate output to an algorithm of a computer device that accounts for lateral slip of the whisker W without the need to adjust actuator orientation to keep the whisker W within the plane of its rotation.

Figure 2A:
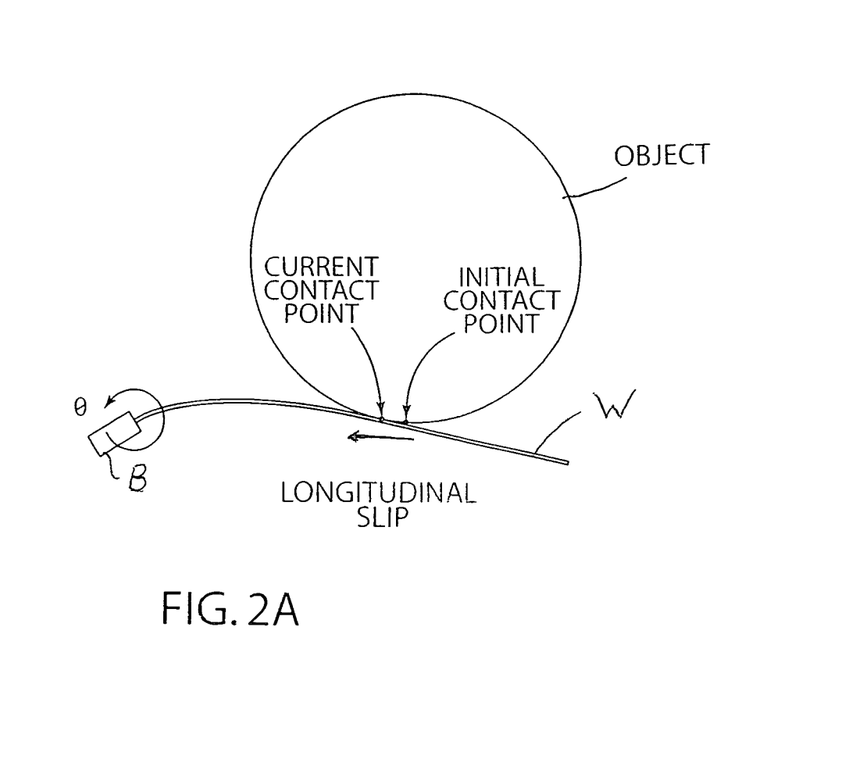
FIG. 2a is a schematic view of the whisker element rotated against an object and illustrating longitudinal slip.
Figure 2B:
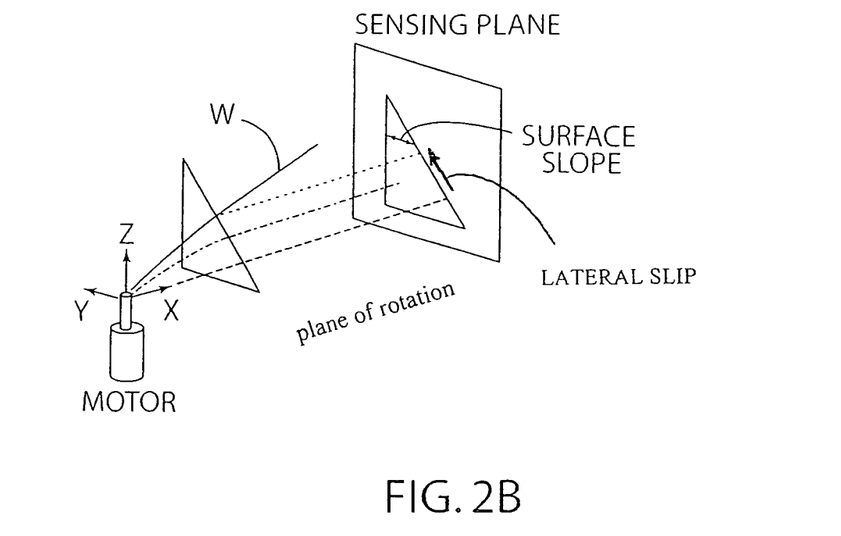
FIG. 2b is a schematic three dimensional view of the sensing device illustrating the plane of rotation (the x-y plane), lateral slip, and the sensing plane that geometrically describes lateral slip.

Referring to FIG. 2a, longitudinal slip is illustrated for a whisker element W rotated by an electric or other motor shown where angular motion of the motor shaft is detected by angle sensor, and moment at the base region of the whisker W is sensed by moment (torque) sensor. Longitudinal slip is a relatively minor complication that arises when the point of object contact is not a sharp edge, but instead has a finite curvature in the plane of rotation (longitudinal curvature) as depicted in FIG. 2a. The result is a decrease in the resulting rotational compliance and underestimation of contact distance. However, the decreased compliance will be negligibly small unless the object surface has extremely low curvature or contact occurred very close to the whisker base. A much more significant complication arises when the object surface is slanted (inclined) relative to the plane of whisker rotation, as depicted in FIG. 2b. That is, the object surface is not perpendicular to the plane of rotation. In such cases, a phenomenon called lateral slip occurs where the point of contact slides significantly along the periphery of the object, the whisker bends outside the plane of rotation and the resulting compliance is much greater than would have occurred without slip, causing equation 2 of the APPENDIX to overestimate d.

As described above, the reported method of Kaneko et al. in IEEE, Trans. Robotic Autom, 14, 278-29 (1998) adjusts the actuator orientation, based on measurement of out-of-plane moment $M_y$, to keep the plane of rotation oriented perpendicular to the object being sensed, avoiding lateral slip. This permits exploitation of the direct proportionality rule that exists when the whisker deflects within the plane of rotation. However, this method is disadvantageous due to the need to actively reorient the whisker multiple times.

Accounting for the lateral slip of the whisker W requires the ability of the torque sensor to measure the bending moment $M_y$ out of the plane of rotation. However, instead of actively adjusting the plane of rotation to avoid lateral slip, an estimate of the friction coefficient $\mu_{est}$ that acts between the whisker element and the object is used to estimate lateral slip and hence the object distance d.

Pursuant to an embodiment of the invention, the lateral slip is sensed and its presence is passively accounted for by measuring out-of-plane moment $M_y$, and utilizing a reasonable estimate of the friction cone angle between the whisker element and the object surface. In practice of this illustrative embodiment of the invention, equation 2 of the APPENDIX is modified to incorporate moment $M_y$ and friction cone angle estimate $\alpha_{est}$, yielding equation 15:

$$d_x = k \frac{\theta}{M_z + M_y \tan\beta_{est}}. \tag{15}$$

where $k = 3EI$ and $\beta_{est} = \alpha_{est} + \tan^{-1}(M_y/M_z)$ (see APPENDIX).

Figure 6:
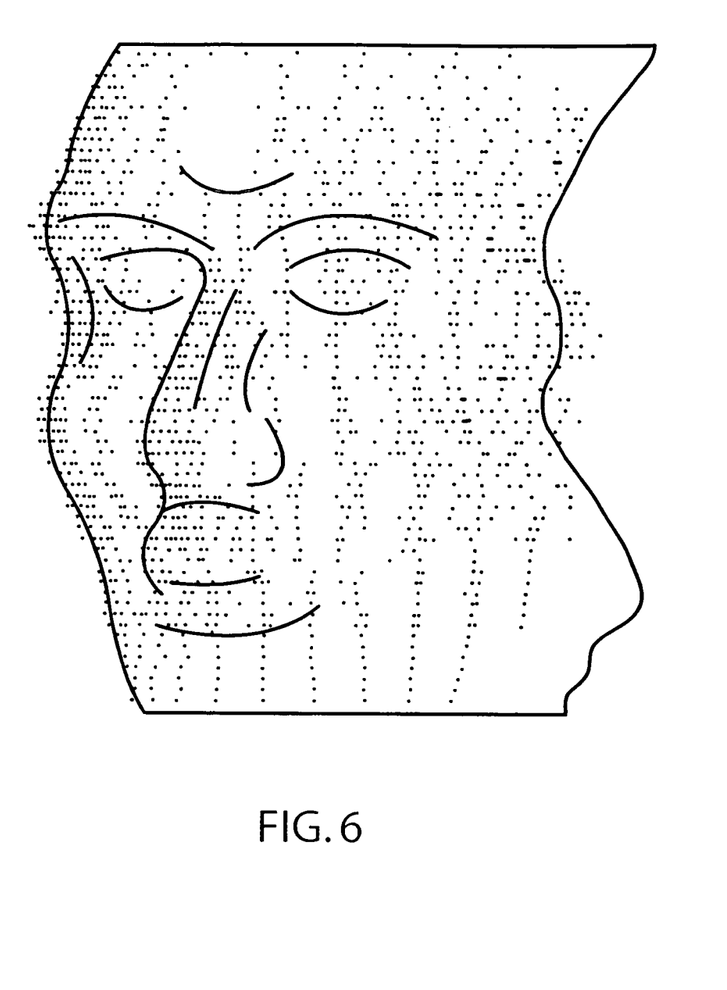
FIG. 6 is a complete splined surface and associated contact points for Example 2.

E is elastic modulus of the whisker element, and I is the moment of inertia of the whisker element. The estimate of object distance thereby accounts for lateral slip in equation 15 in this embodiment by measuring and accounting for deflection of the whisker element outside of the plane of movement. The results [estimated object distance(s) and/or contours] determined in practice of the invention are stored, displayed, or conveyed to or available to a user (e.g. see FIGS. 6 and 8).

The need to adjust the plane of rotation is thus effectively eliminated by practice of the invention as long as a reasonable estimate can be made for the friction coefficient between the whisker and the surface. As explained in the APPENDIX, inaccurate estimate of friction cone angle between the whisker element and the object surface can lead to distance extraction inaccuracy. However, so long as $\alpha_{est}$ (friction cone angle) falls within a moderate range of true friction cone angle, the distance extraction will be accurate even for steep surface slopes. For example, if $\alpha_{est}=10°$, distance extraction will be accurate to within 5% so long as the true friction cone angle $\alpha$ ranges between 8.2° and 11.7° and surface slope $\beta$ is less than or equal to 60°, or to within 10% accuracy so long as friction cone angle $\alpha$ ranges between 7.8° and 12.3° and surface slope $\beta$ is less than or equal to 70°.

With respect to lateral curvature of the object surface, the model of the APPENDIX assumes that the surface being contacted is flat; i.e. has a lateral curvature of zero. The effect of curvature on distance extraction must be considered in the context of three additional variables: $\theta$, $\alpha$ and $\beta_0$ (surface slope at the initial contact point). When so considered, the consequence of lateral curvature of the surface being contacted is relatively mild. For example, given a significantly curved surface with a normalized radius of curvature of the surface, $r_n=1$ (i.e., lateral radius of curvature equals radial contact distance d), and a reasonable pushing angle of $\theta=3°$, a surface slope $\beta_0$ of 63° will result in a 5% distance extraction error and a surface slope $\beta_0$ of 74° will result in a 10% distance extraction error. Increasing $\theta$ to 5° would decrease the maximum surface slope $\beta_0$ to 52° and 65°, respectively.

Figure 3:
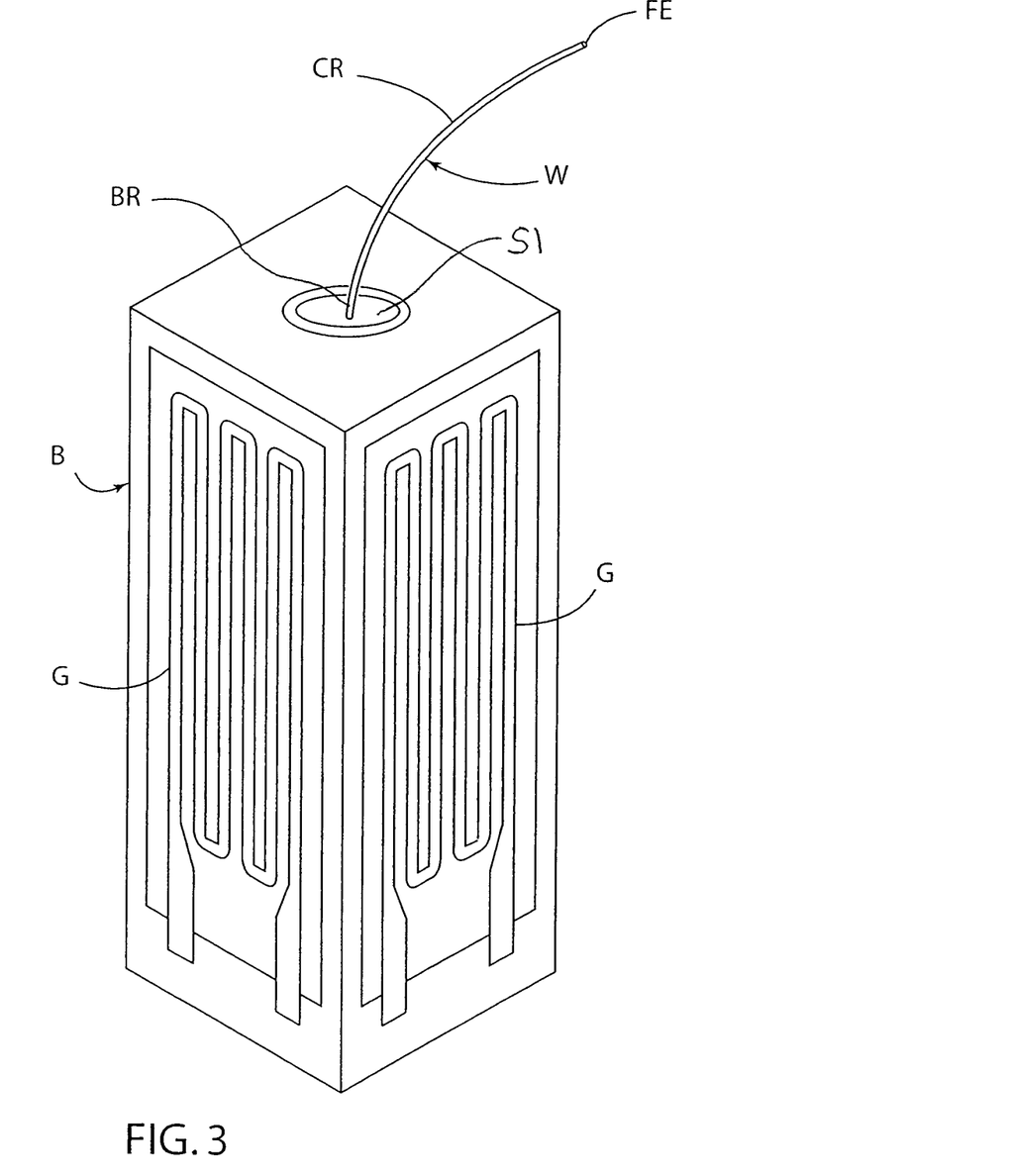
FIG. 3 is a schematic perspective view of a sensing device pursuant to an illustrative embodiment of the invention.

Referring to FIG. 3, a sensing device is shown pursuant to an illustrative embodiment of the invention that can supply appropriate output to an algorithm of a computer device that incorporates equation 15 to accomplish radial distance extraction. The sensing device includes an elongated whisker element W having a flexible cantilever region CR with a free end FE and a base region BR where a moment is generated by deflection (bending) of the cantilever region as it contacts the object. One or more sensor elements G are cooperatively associated with the whisker element W to provide one or more output signals that is/are representative of two orthogonal components of moment, $M_y$ and $M_z$ exerted at the whisker base region.

In particular, in FIG. 3, an artificial cylindrical whisker element W has a base region BR that is fixedly mounted on a mounting body B to provide a fixed center of rotation at a fixed speed of rotation. The one or more sensor elements G are mounted on the orthogonal faces of the mounting body B in manner to sense two-axis moments $M_z$ and $M_y$ at the base region BR from forces acting on the flexible cantilever region CR of the whisker and transmitted to the mounting body.

Figure 4:
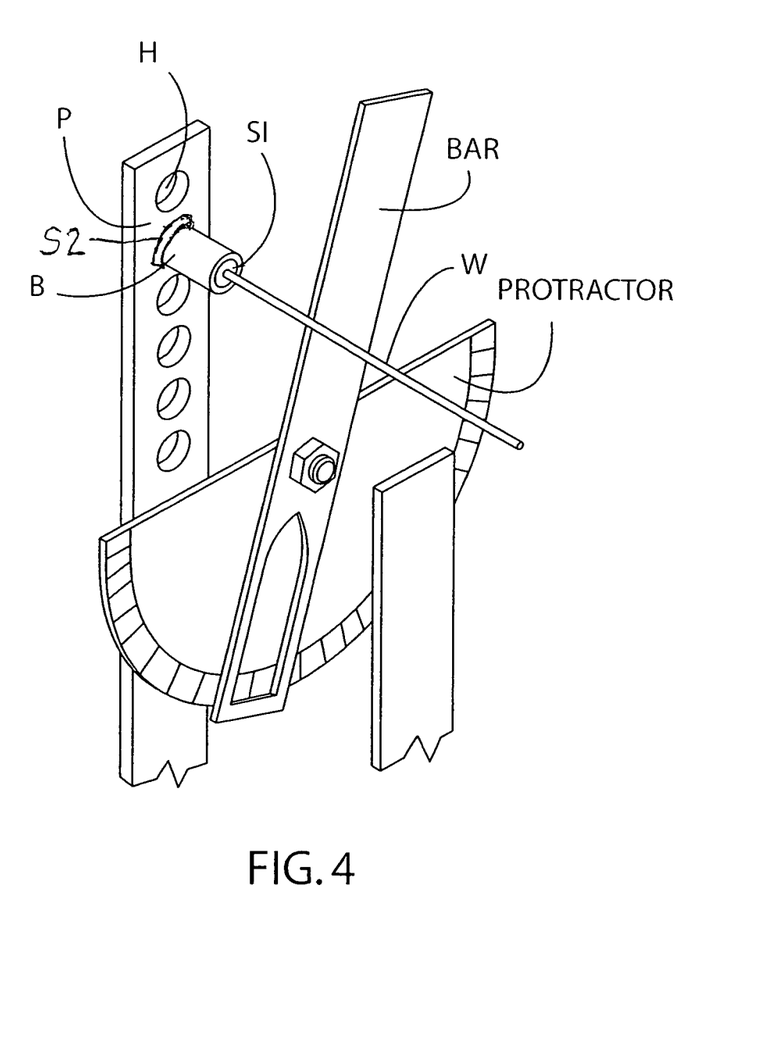
FIG. 4 is a perspective view of the sensing apparatus used for model validation experiment of Example 1.
Figure 5:
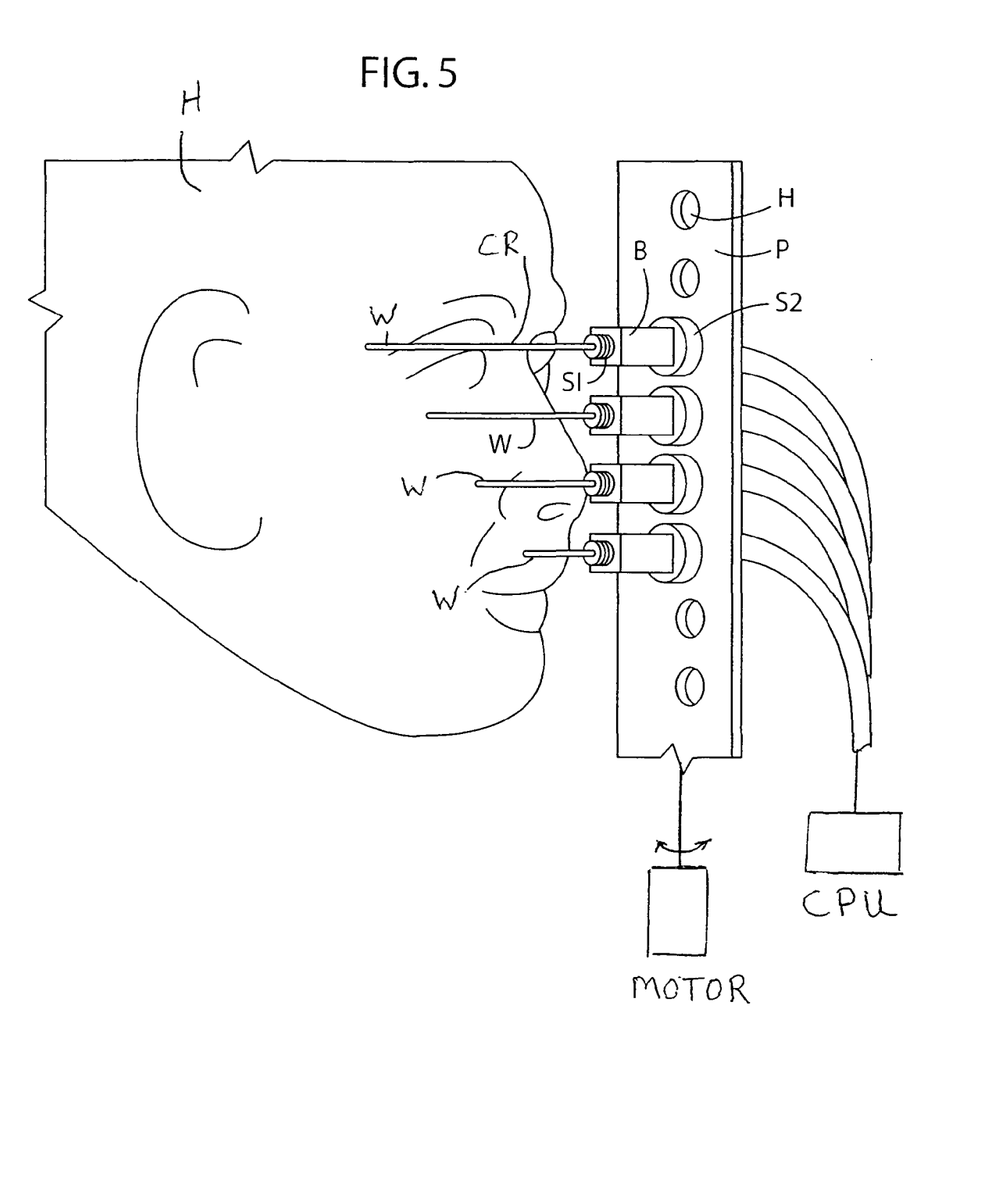
FIG. 5 is a perspective view of the sensing apparatus used for model validation experiment of Example 2.

In an illustrative embodiment of the invention offered for purposes of illustration and not limitation, the sensing device can comprise a straight superelastic Nitinol metallic wire (1 mm diameter, 10 cm length), with a small set screw S1 (FIGS. 4 and 5) attached at the base region BR of the Nitinol wire by adhesive (e.g. cyanoacrylate-superglue) or any other attachment mechanism. The set screw S1 allows different size and shape Nitinol wires to be easily interchanged within the mounting body B. The mounting body B comprised a small aluminum block (4×4×8 mm) with the center tapped to receive the outer threaded region of the set screw S1. Each of the four flat faces of the mounting body was fitted with a conventional strain gauge G, allowing independent measurement of $M_z$ and $M_y$, and the mounting body B itself is attached to a larger set screw S2 to allow easy connection to an array shown in FIG. 5 for purposes of illustration and not limitation. In FIGS. 4 and 5, the array design comprised a vertically oriented aluminum plate P with a series of threaded holes H that allows any given number of sensing devices having set screws S2 to be mounted and configured in a single column. An aspect of this particular embodiment of the invention, although it is not necessary for all embodiments, is that it positions the base of the mounting body (and the fixed tips of their cantilever regions) at the center of rotation. This simplifies distance extraction because the analysis exactly conforms to the model described in the APPENDIX; however, the equations can easily and obviously be modified to accommodate for rotations and/or translations when the whisker base is not at the center of rotation.

The invention envisions using strain gages or other alternative two-axis deflection and/or two-axis moment and/or two-axis curvature sensor elements that include, but are not limited to, light emitting diodes/receivers, fiber optics, optical emitter/detector pairs (described in reference Hirose et al. 1990), magnetic sensors including Hall-effect sensors (described in reference Hipp et al. 2006), capacitive coupling (described in reference Fend et al. 2003), linear differential transformer (LVTD) sensors, video cameras (described in Kaneko et al. 2001), electric dial gages (described in reference Kaneko and Tsuji 2000), and piezoelectric sensors. The sensor elements preferably are selected to determine two orthogonal components of a change in moment, curvature or other deflection of the whisker element as a result of its bending. For example, the moment of the whisker element at the base region is directly proportional to the change in curvature of the whisker element at the base region (the whisker element, including its base region, need not be straight while at rest). Specifically, $\Delta\kappa = M(s)/EI$ where $\Delta\kappa$ is change in curvature, s is the arc length, M is moment, E is elastic modulus, and I is moment of inertia of the whisker element wherein E and I may also vary with s. The above mentioned sensor elements can be used in practice of the invention to determine two orthogonal components of a change in curvature (or moment) of the whisker element at the base region as a result of bending of the whisker when it contacts an object.

The output of the sensor elements is representative of the two orthogonal components of change in curvature (or moment) of the whisker element for use as described above as input to the computer to determine object distance with accounting for lateral slip.

In practicing the method described above, consistently reliable object distance extraction in the presence of significant surface slopes includes a reasonable estimate of the friction coefficient between the whisker element and the object. There are three possible methods by which an estimate of friction might be obtained, as follows:
1. If the orientation of the entire whisker array can be tilted along the x-axis of any particular whisker, whisks would be performed against the object at a variety of orientations, effectively adjusting the surface slope. The range of slopes for which $\phi=0°$ would be equal to $2\cdot\alpha$ (the accuracy depending on how gradually the orientation was adjusted). This essentially amounts to an in-field test of the object to determine the friction coefficient.
2. Have the array explore the object, and repeat the feature extraction algorithm (the transformation of contact points into 3-D object shape, e.g. splining) using a range of friction coefficients. The one that leads to the most consistent contact point positions and thus the smoothest surface is kept.
3. Have the array whisk against the object at a variety of array orientations. All the contact points sampled are given a confidence measure related to $\phi$, such that points with large $\phi$ are ignored or have less influence on the feature extraction algorithm.

Note that methods 1 and 2 assume the friction coefficient is consistent over the entire object, while method 3 does not.

One final issue involves contact occurring at the whisker free tip or end. Such cases may result in increased rotational compliance, causing equation 15 to estimate $d_x$ to be greater than the whisker length. The solution is to simply give $d_x$ a threshold equal to the whisker length. It is also worth noting that regions of an object that are concave with respect to the plane of whisker rotation can only be sampled through tip contact with a straight whisker. Tip contact is thus actually desirable for two reasons: it potentially helps provide a very precise measurement of contact distance (since the whisker length is fixed), and allows concave regions of an object to be sampled.

Example 1

Figure 4A:
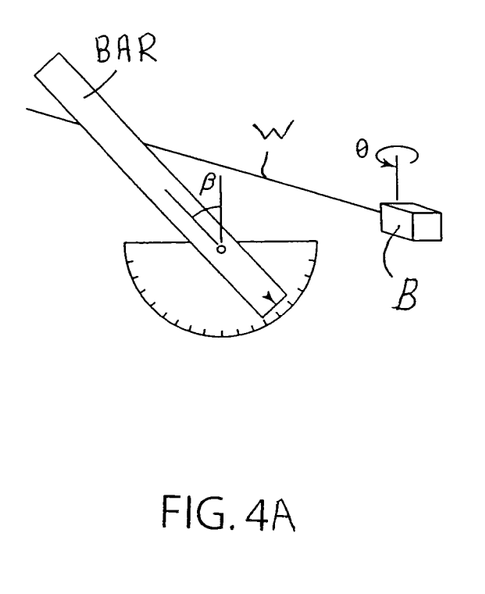
FIG. 4a is a simplified view of the apparatus showing the angles involved.

With respect to FIGS. 4 and 4a, an experiment involved rotating the whisker W against a slender stainless steel bar at a variety of surface slopes (see FIG. 2b): from surface slope=0° (vertical) to 75° (nearly horizontal), in 5° increments, and at two different speeds: =10 deg/s and 90 deg/s. Surface slope was determined using the protractor shown. Signals from the strain gages at the base were first calibrated from voltage to moment. The $M_y$ component was calibrated by rotating the whisker against the bar with $\beta=0°$ at a radial distance of $d_x=5$ cm. Ten whisks were performed at each of the two velocities. The location at which the whisker gently touched the bar was defined as $\theta=0°$. Whisker trajectories were chosen to ensure a smooth acceleration to the maximum velocity. For $\dot\theta=10$ deg/s the whisker was rotated through a range of −3° to 12°, while for $\dot\theta=90$ deg/s, an expanded range of −15° to 20° was used. The mounting body was then rotated 90° and the calibration process repeated for $M_z$.

All data were filtered at 800 Hz, sampled at 2000 Hz and passed through a zero-phase digital filter with a cutoff frequency of either 5 Hz (for $\dot\theta=10$ deg/s) or 45 Hz (for $\dot\theta=90$ deg/s). The strain gages each were incorporated into a Wheatstone half-bridge. All data analysis was performed using MATLAB v7.0 software on an Intel Pentium IV computer having equation 15 programmed as part of an operating algorithm. Equation 2 of the APPENDIX with a push angle $\theta=3°$ was used to arrive calibration factors between voltage and moments $M_y$ and $M_z$.

Experimental data were gathered in the same way as the calibration process, but for varying surface slopes. For each surface slope, the plane of the bar was perpendicular to the orientation of the whisker at $\theta=0°$. An excellent fit between model (equations 9, 10 and 11) and experiment was obtained for whisking against the steel rod at 10 deg/s, with the resulting estimation of friction cone angle being $\alpha_{est}=10.5°$. At 90 deg/s, the data again conforms well to the model, the fit yielding $\alpha_{est}=12.3°$, but the standard deviations are significantly higher. A rough surface obtained by providing 180 grit sandpaper stuck on the stainless bar introduced a problem regarding friction known as stick-slip, in which the whisker would irregularly switch between periods of no slip, smooth slip and sudden, abrupt slip. This led to moderately inconsistent results for $\dot\theta=10$ deg/s. However, stick-slip seemed to have a less significant impact for $\dot\theta=90$ deg/s. The fits to $\dot\theta=10$ and 90 deg/s. yielded $\alpha_{est}=23.3°$ and 18.7°, respectively.

The above-described embodiment of the invention provides a so-called tapping method for implementing radial distance detection with an artificial whisker W in the presence of significant lateral slip (lateral deflection in the z-direction) and surface-friction. By modeling the whisker as a rotating (or translating) cantilever beam, it is possible to interpret the sensed moment to infer information about the object being touched. Using tapping techniques, the whisker need only rotate (whisk) a small (approximately 2 to 5°) angle past initial object contact, so that the radial distance of contact can be inferred. The method requires only that the whisker be equipped with a two-axis sensor at the base that can measure moment and/or curvature, and works best when a reasonable estimation for the object's friction coefficient is available. An important advantage of this method is that it does not require that each whisker can independently adjust its plane of rotation, and is thus very amenable to implementation on a large-scale array.

Example 2

This example involves a whisker array for quickly and consistently extracting complex object features using only a small number of whisks. To investigate the shape-extraction capabilities, a 4×1 vertical array of robotic whiskers W was constructed as shown in FIG. 5. Each Nitinol wire cantilever region CR emerged from a set-screw S1 (visible in the figure), which was inserted into a rectangular mounting body (B), also called a "follicle." The follicle was fitted with four strain gages on the faces (not shown so see FIG. 3). In this embodiment, the follicle constitutes the whisker base region used to measure the two orthogonal components of moment as described above. The base of each follicle was threaded to match the threads in the holes on the 4×1 array, so that each follicle could easily be inserted into the array.

The vertical array was tested by tapping ("whisking") it against a small sculpted head H, shown in FIG. 5—a complex object selected specifically for its intricate concavities and convexities. In particular, the plate P was rotated by an AC motor about a vertical rotational axis that included the fixed end regions of the whisker elements W. Whisks were performed with the array positioned at evenly spaced heights and angles relative to the sculpted head so as to cover the head's entire left side. Each whisk provided four radial contact points in 3D space (one for each whisker). Splining the contact points and mirror-imaging the left side to the right then resulted in a faithful extraction of the original shape of the sculpture, FIG. 6.

In particular, calibration between voltage and moment $M_y$ for the artificial whisker array was performed by sweeping each whisker five times against a peg placed at a single distance of 2 cm. In this particular example, a low whisking velocity (10 deg/sec) minimized inertial effects and maximized the resolution of contact angle detection. These parameters could be changed to be more suitable for any particular application. This same procedure was then done with the whisker mounting body rotated 90° to calibrate between voltage and moment $M_z$.

To gather experimental data, the sculpted head was fixed at the center of a cylindrical coordinate system (r, θ, z) while the array whisked at several different positions. Note that θ of this general coordinate system is not the same as the angle θ through which the whisker deflects. The array was positioned at regular intervals of height z and angle θ. The choice of radial distance from the motor shaft to the head was necessarily dictated by the requirement that the whiskers make contact with all regions of the left side of the head (Table 1).

TABLE 1

The array was positioned in regular intervals of height z and angle θ, while distance r was manually chosen to ensure whisker contact with all regions of the face.

| z (cm) | θ (degrees) | r (cm) |
| --- | --- | --- |
| 0.000-2.000, 0.125 cm increments | 0-60°, 10° increments | 5.00 |
| 2.125-3.250, 0.125 cm increments | " | 4.75 |
| 3.375-4.250, 0.125 cm increments | " | 5.50 |
| 4.375-6.000, 0.125 cm increments | " | 5.25 |

A single whisk was performed at each position. Analog signals from each whisker base were filtered at 160 Hz, sampled at 500 Hz and then passed through a zero-phase digital filter (period=½ second). All data analysis was performed using MATLAB v7.0 software on Intel Pentium IV computer (CPU) having equation 17 programmed as an operating algorithm (i.e., $\alpha_{est}$ was assumed to be zero).

The location of each contact point was then computed relative to the array. The angular component θ was taken to be the angle at which the whisker first made contact with the object (when d|M|/dt crossed a small threshold), and the radial d component was found using equation 17 of the APPENDIX.

A total of 343 whisks were performed. In cases where a whisker did not make contact, or the data analysis showed that the whisker hit on the right side of the face, the data were automatically removed. All other contact points were mirror-imaged to the right side of the head. The longer whiskers captured the broad convex features, while the shorter whiskers explored the finer concave regions. Equation 17 was also used to determine when contact occurred at a whisker tip. Tip contact always resulted in an estimate of d very close to or greater than the whisker length. In the case that estimated d was greater than the whisker length, d was automatically set equal to the length. Thus, equation 17 provided the information that contact did indeed occur at the whisker tip and not mid-length. This would not have been possible had the sensing mechanism been, for example, a simple binary contact-switch.

Note that regions of the sculpted head that are concave in the plane of rotation (for any given height) are only reachable through tip contact, which accounts for 25% of the splined surface. A total of 1036 contact points on the left side were collected, with 438 points determined through equation 17 to occur at or near the tip (42% of all points). The points were converted to head-centered Cartesian coordinates to simplify splining, mirror-imaged to the right side, and plotted along with the spline to create FIG. 6.

Example 3

Figure 7:
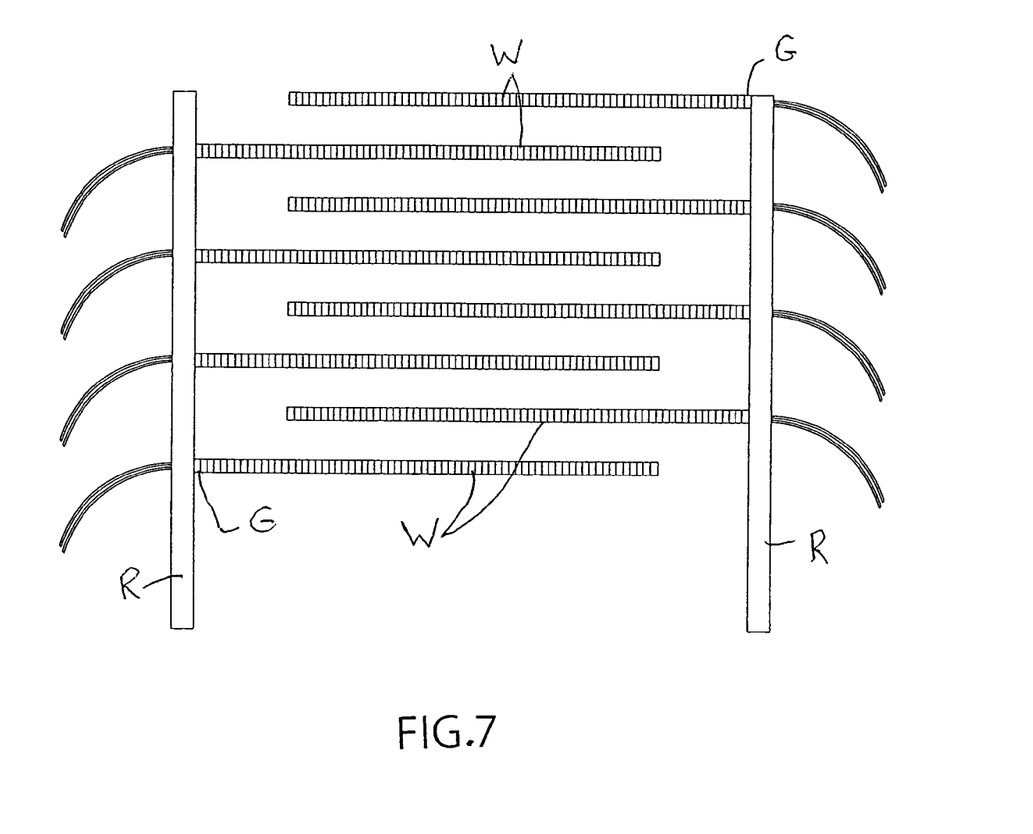
FIG. 7 is a front view of the sensing apparatus used for sensing fluid flow profile of Example 3.

To examine the ability of whiskers to characterize fluid flows, two opposing 4×1 whisker arrays shown in FIG. 7 were used. To estimate the shape of a variable fluid flow profile in two dimensions, two artificial whisker arrays were arranged in a plane. The sensing element was reduced to one dimension (i.e., $M_z$ only, although $M_y$ can also be used in general) and the whiskers took the form of highly-flexible plastic strips to increase the surface area exposed to the flow and maximize bending. The plastic strips were Flex Sensors, a commercial-off-the-shelf sensing technology that can measure bending along the plastic strip. However, in this embodiment, all bend-sensitive elements along the length of the Flex Sensor were shorted out except the one sensor element G closest to the base. The flexible strips are glued to the vertical stainless steel support rods R having a length of 19 cm. The dimensions of the each flexible strip are 0.5 cm width by 11 cm length, the strips being available from Jameco Electronics. Compressed air is directed from a compressed air source towards the center of the plane formed by the flexible strips.

The sensor element of each flexible strip was calibrated over a range of deflections to account for any nonlinear sensing properties, giving a calibration factor from voltage to moment. A compressed air source was centered at two distances (15 cm and 40 cm) in front of the array, and data were averaged over five seconds for each whisker. Averaged analog voltage signals from the strain gages at each whisker base were directly converted to moment using the calibration factor. All data analysis was performed using MATLAB v7.0 software on an Intel Pentium IV computer programmed with the operating algorithm described in the next paragraph First, the true value of the air speed was determined by placing a Pitot tube with an attached manometer at the height of each whisker. Next, the square root of moment (moment being proportional to distributed load) was calibrated to air speed to characterize the flow, consistent with the Bernoulli equation for incompressible flow. Ten trials were taken for both the experimental (whisker) and control (Pitot tube) data.

Figure 8:
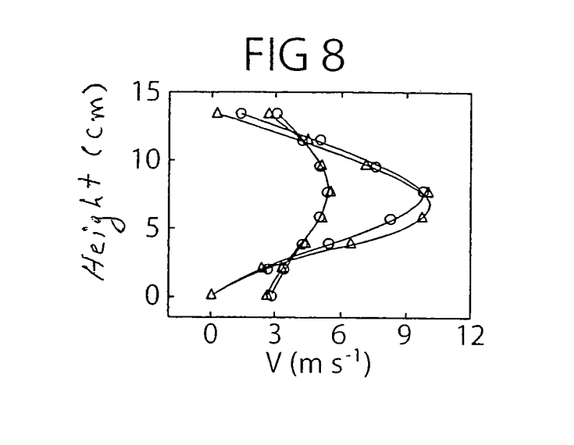
FIG. 8 is a graph of fluid flow profile of air velocity versus whisker (strip) height in the array of Example 3 where measurements were made with a compressed air source at two different distances in front of the array and where triangle data points are obtained from whiskers and circle data points are obtained from Pitot tube.

When the stream of air was directed toward the center of the array, each whisker deflected by a magnitude dependent on its distributed load, permitting accurate characterization of the shape of the fluid stream. As shown in FIG. 8, velocity estimates using the (square root of) moment from the base of each whisker matched up will with the Pitot tube data. More complex whisker configurations would allow flow patterns to be described in three dimensions, potentially enabling wake following (remote tracking) of moving underwater objects.

It is noted that this technique does not give information about the load as a function of position along the whisker length. Instead, each whisker in the array gives a single estimate of flow velocity at a given height by integrating the distributed load over its length. Because the eight whiskers are at different heights, the flow profile can be characterized in the z-direction. Using whiskers of different lengths and in different array configurations could allow three-dimensional characterization of the flow pattern.

Figure 9:
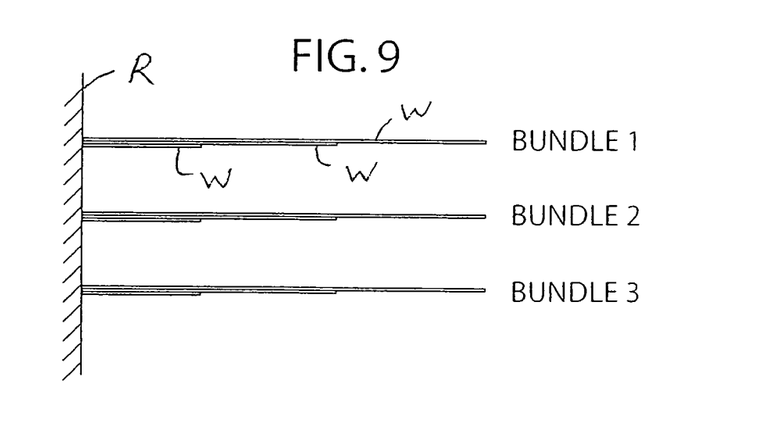
FIG. 9 is a schematic side view of three bundles of whiskers, each containing three whiskers of different length.

Underwater applications will benefit from the ability to sense fluid flow profiles. Again using a traditional cantilever beam model, but also arranging bundles of several whiskers of different length in parallel and with their base regions closely aligned as in FIG. 9, it is possible to estimate the 1D (one dimensional) velocity profile of the fluid flow along the bundle's axis. Arranging several such bundles of whiskers in a plane, it is possible to estimate the velocity profile of the fluid within the cross-section of the plane to arbitrary accuracy (depending on the number of whiskers and their spacing). Furthermore, arranging several such cross-sections of whiskers in a row can allow for description of the velocity profile within a volume of fluid. Practical considerations of this method may involve whiskers colliding with one another, and specifically for the three-dimensional case, whiskers planes near the front of the flow influencing the flow profile before it reaches whisker planes that are towards the back of the flow. These results have potential applications to both land-based robots and underwater autonomous vehicles, in which robust tactile perception could enable a wide range of behavioral capabilities.

APPENDIX

Calculations

The whisker is modeled as a straight, cylindrical, flexible beam rotating with a fixed center of rotation and at a constant velocity. At some point, the whisker comes into contact with an object, at which time the task of finding the distance from the whisker base to contact point arises. We assume the object is rigid and that the point of contact is fixed, discrete, and exists somewhere along the length of the whisker (as opposed to the tip, a condition which is discussed in the Description Of The Invention Section). In the case that lateral slip is negligible, the configuration of the whisker can be described in 2-dimensions as shown in FIG. 1.

Because only a small deflection is needed to sense the rotational compliance, classical linear beam theory can be used. The whisker rotates by a small pushing angle $\theta$ against an object at radial distance $d_x$, imposing a deflection $d_y$. The resulting bending moment $m_z$ at the base of the whisker is measured by a torque sensor. Under these conditions, Kaneko et al. showed that the rotational compliance $C_\theta$ is directly proportional to object distance, and can be expressed as:

$$d_x = kC_\theta \quad (1)$$

where k=3EI, E is the elastic modulus of the whisker and I is the area moment of inertia of the whisker ($I=\pi/4 \cdot ^4$, where r is the radius of the beam's cross-section). Rotational compliance is defined as the ratio of angular displacement to bending moment at the base, allowing us to write $$d_x = k\frac{\theta}{M_z}. \quad (2)$$

When the orientation of the object is not perpendicular to the plane of rotation, lateral slip may occur, in which case the contact point will drag along the periphery of the object, as shown in FIG. 2b. The resulting rotational compliance will be greater than when lateral slip does not occur, causing equation 2 to overestimate $d_x$. There are three specific conditions at the region of contact that affect if and how lateral slip occurs:
1. the slope of the surface at the contact point within the sensing plane,
2. the curvature of the surface within the sensing plane, and
3. the frictional properties between the whisker and the object.

In the results that follow, the slope of the surface will be directly accounted for. We know that lateral curvature has only a mildly detrimental impact on distance extraction in most cases as long as $\theta$ is sufficiently small. Friction can present some difficulties, although there are ways to address them which are discussed. For now, we assume that the surface curvature is zero (i.e. is flat) and that traditional Coulomb friction exists between the whisker and the surface. Because this is a quasi-static analysis, any possible discrepancies between static and kinetic friction coefficients are assumed to be negligible.

To sense lateral slip, the torque sensor (strain gage(s)) at the base of the whisker must be equipped to measure out-of-plane bending of the whisker, i.e. bending moment $M_y$. Understanding how to make use of $M_y$ to account for the lateral slip is aided by analysis of the sensing plane, illustrated in FIG. 2b.

The sensing plane is an imaginary 2-D projection of the region where the whisker is touching the object, parallel to the y-z plane and intersecting the contact point. In FIG. 2b, the dashed line indicates the initial contact point, the dotted line indicates the current contact point, and the dash-dotted line indicates where the whisker would intersect the sensing plane were it not obstructed by the surface—the so-called 'virtual point'. A basic geometrical analysis of the relationships between variables in the sensing plane is sufficient to derive a modified form of equation 2 that accounts for the lateral slip.

Figure 2C:
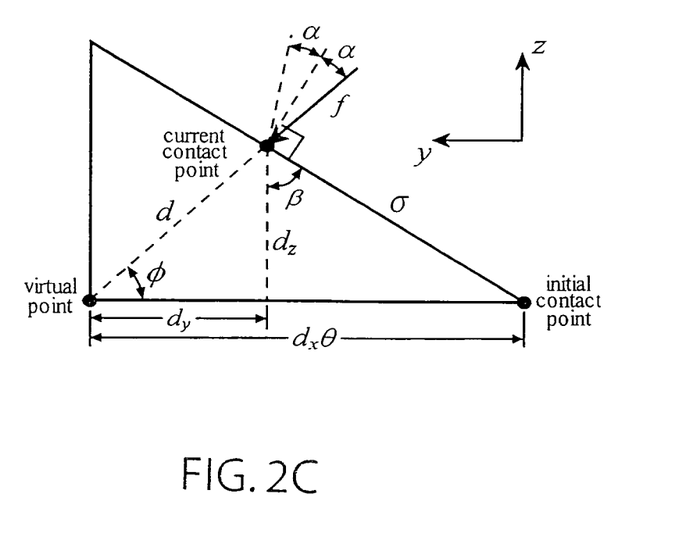
FIG. 2c is a schematic of a sensing plane used in the calculation set forth in the APPENDIX.

FIG. 2c defines the relevant variables projected on the sensing plane. It geometrically predicts the lateral slip a of the whisker along the object, depending on the local surface slope $\beta$ and the friction cone angle $\alpha$. Slip will not occur when $\alpha \geq \beta$ because in this case no movement of the contact point is required to keep the contact force f within or on the boundary of the friction cone, and the resulting slip angle $\phi$ will be zero. Conversely, when $\alpha < \beta$, the contact point will slip just enough to enable static equilibrium, resulting in a contact force angle of $\beta - \alpha$.

Summarizing, we have $$\text{if } \begin{cases} \alpha \geq \beta, & \phi = 0 \\ \alpha \leq \beta, & \phi = \beta - \alpha \end{cases} \quad (3)$$

which can be expressed more compactly as $$\phi = \max(0, \beta - \alpha). \quad (4)$$

Notice that the overall linear deflection is now split into two components: $d_z$ and $d_y$. The distance between the virtual point and the initial contact point is simply the contact distance $d_x$ multiplied by $\theta$. We also can now give a concrete geometric definition to the lateral slip $\sigma$ as the distance the whisker slips along the object surface in the lateral plane:

$$\sigma = \frac{d_x \theta \tan\phi - \phi \cos\beta}{\tan\phi \sin\beta} \quad (5)$$

Using this model of lateral slip, we seek an equation analogous to equation 2 that will allow determination of the distance $d_x$ based on known and measurable variables: E, I, $\theta$, $M_z$ and $M_y$. In the absence of lateral slip, it is clear that $\theta = \tan(d_y/d_x)$. For small angles, $\theta = d_y/d_x$, which we plug into equation 2 to obtain:

$$M_z = k\frac{d_y}{d_x^2}. \quad (6)$$

Note that this equation holds when lateral slip occurs (FIG. 2b) because it simply relates moment in the z-direction to deflection in the y-direction, neither of which are affected by independent deflection of the whisker in the z-direction ($d_z$).

By symmetry, the same linear scaling between $m_z$ and $d_y$ also holds for $m_y$ and $d_z$:

$$M_y = k\frac{d_z}{d_x^2}. \quad (7)$$

Furthermore, from FIG. 2c, it is clear that $$\tan\beta = \frac{d_x\theta - d_y}{d_z} \quad (8)$$

and $$\tan\phi = \frac{d_z}{d_y} = \frac{M_y}{M_z}. \quad (9)$$

Combining equations 6, 7 and 9 and solving for $M_z$ yields:

$$M_z = \frac{k\theta}{d_x}\left(\frac{1}{\tan\beta\tan\phi + 1}\right) \quad (10)$$

Combining equations 7, 8 and 9 and solving for $M_y$ yields:

$$M_y = \frac{k\theta}{d_x}\left(\frac{1}{\tan\beta + \cot\phi}\right). \quad (11)$$

Combining equations 6, 7 and 8 and solving for $d_x$ yields:

$$d_x = k\frac{\theta}{M_z + M_y\tan\beta}. \quad (12)$$

Unfortunately, there's no way to reliably estimate the surface slope $\beta$ in the presence of unknown friction. The most straightforward concession that can be made to arrive at a solution is to assume or estimate some nominal friction coefficient $\mu_{est}$. First, we note that $$\alpha_{est} = \tan^{-1}(\mu_{est}). \quad (13)$$

If we now assume $\alpha_{est} \leq \beta_{est}$, $\beta_{est}$ can easily be computed using equation 3:

$$\beta_{est} = \phi + \alpha_{est} \quad (14)$$

Replacing the unknown surface slope $\beta$ from equation 12 with $\beta_{est}$ yields $$d_x = k\frac{\theta}{M_z + M_y\tan\beta_{est}}. \quad (15)$$

Note that equation 15 is reliable even when $\alpha_{est} > \beta_{est}$ (contrary to equation 14's assumption that $\alpha_{est} \leq \beta_{est}$) because in this case $M_y = 0$ and the term $M_y \tan\beta_{est}$ becomes zero as well.

One obvious situation to consider is that of frictionless contact, resulting in $\beta_{est} = \phi$ and thus $$d_x = k\frac{\theta}{M_z + M_y^2/M_z}, \quad (16)$$

which can alternatively be written as $$d_x = k\frac{\theta}{|M|}\cos\phi, \quad (17)$$

where $|M| = \sqrt{M_z^2 + M_y^2}$.

REFERENCES

T. N. Clements, C. D. Rahn, "Three dimensional contact imaging with an actuated whisker," *IEEE Trans. Robot.*, vol. 22, no. 4, pp 844-848, August 2006.

G. Dehnhardt, B. Mauck, W. Hanke, and H. Bleckmann, "Hydrodynamic Trail-Following in Harbor Seals (*Phoca vitulina*)," *Science*, vol 293, pp. 102-104, Jul. 6, 2001.

M. Fend, S. Bovet, H. Yokoi, and R. Pfeifer, "An active artificial whisker array for texture discrimination," in *Proc. IEEE/RSJ Int. Conf. on Intel. Robots and Systems*, pp. 1044-1049, 2003.

M. Fend, H. Yokoi and R. Pfeifer, "Optimal morphology of a biologically-inspired whisker array on an obstacle-avoiding robot," in *Proc. of the 7th Eur. Conf. on Artificial Life*, pp. 771-780, 2003

J. Hipp, E. Arabzadeh, E. Zorzin, J. Conradt, C. Kayser, M. E. Diamond and P. König, "Texture signals in whisker vibrations," *J. Neurosci.*, vol. 95, no. 3, pp. 1792-1799, 2006.

S. Hirose, S. Inoue and K. Yoneda, "The whisker sensor and the transmission of multiple sensor signals," *Advanced Robotics*, vol. 4, no. 2, pp 105-117, 1990.

D. Jung and A. Zelinski, "Whisker-based mobile robot navigation," in Proc. IEEE/RJS Int. Conf. on Intelligent Robots and Systems, vol. 2, pp. 444-449, 1996.

M. Kaneko, N. Kanayama, and T. Tsuji, "Active antenna for contact sensing," *IEEE Trans. Robot. Automat.*, vol. 14, pp. 278-291, April 1998.

M. Kaneko, N. Kanayama, and T. Tsuji, "Vision-Based Active Sensor Using a Flexible Beam," *IEEE/ASME Trans. Mechatron.*, vol. 6, no. 1, pp. 7-16, March 2001.

M. Kaneko and T Tsuji, "A whisker tracing sensor with 5 μm sensitivity," in *Proc. IEEE/RSJ Int. Conf. on Intel. Robots and Systems*, pp. 3907-3912, April, 2000.

D. J. Krupa, M. S. Matell, A. J. Brisben, L. M. Oliveira and M. A. L. Nicolelis, "Behavioral properties of the trigeminal somatosensory system in rats performing whisker dependant tactile discriminations," *J. Neurosci.*, vol. 21, no. 15, pp. 5752-5763, Aug. 1, 2001.

R. A. Russell, "Using Tactile Whiskers to Measure Surface Contours," in *Proc. IEEE Int. Conf. on Robotics and Autom.*, pp. 1295-1299, May, 1992.

R. A. Russell and J. Wijaya, "Object location and recognition using whisker sensors," *Australian Conference on Robotics and Automation*, CD-ROM Proceedings ISBN 0-9587583-5-2, 2003.

G. R. Scholz and C. D. Rahn, "Profile sensing with an actuated whisker," *IEEE Trans. Robot. Automat.*, vol. 20, no. 1, pp. 124-127, February 2004.

A. E. Schultz, J. H. Solomon, M. J. Peshkin, M. J. Hartmann, "Multifunctional whisker arrays for distance detection, terrain mapping, and object feature extraction," in *Proc. IEEE Int. Conf. on Robotics and Autom.*, pp. 2588-2593, April, 2005.

T. Tsujimura and T. Yabuta, "Object detection by tactile sensing method employing force/torque information," *IEEE Trans. Robot. Automat.*, vol. 5, pp. 444-450, August 1989.

N. Ueno, M. Svinin, and M. Kaneko, "Dynamic contact sensing by flexible beam," *IEEE/ASME Trans. Mechatron.*, vol. 3, no. 4, pp. 254-264, April 1998.

J. Wilson and Z. Chen, "A whisker probe system for shape perception of solids," *ASME J. Dynam. Syst., Meas., Contr.*, vol. 117, pp. 104-108, 1995.

H. Yokoi, M. Fend, and R. Pfeifer, "Development of a Whisker Sensor System and Simulation of Active Whisking for Agent Navigation," in *Proc. IEEE/RSJ Int. Conf. on Intel. Robots and Systems*, pp. 607-612, September 2004.

While certain embodiments of the invention have been described in detail above, those skilled in the art will appreciate that changes and modifications can be made therein within the scope of the invention as set forth in the appended claims.

The invention claimed is:

1. A sensing apparatus comprising:
    (a) a plurality of sensing devices, each said sensing device comprising:
        (i) an elongated whisker element having a deflectable cantilever region and a base region where a change in moment or curvature is generated by deflection of the cantilever region, and
        (ii) one or more sensor elements cooperatively associated with the whisker element to provide one or more outputs that is/are representative of change in moment or curvature exerted at the base region;
    (b) a fluid flow source to direct fluid toward the plurality of sensing devices; and
    (c) a computer device to determine a fluid velocity profile using the one or more outputs of one or more sensing devices.

2. The sensing apparatus of claim 1, wherein the plurality of sensing devices are arranged in an array to determine fluid velocity profile along a dimension or axis.

3. The sensing apparatus of claim 2, wherein each sensing device comprises whisker elements of different lengths arranged in a bundle.

4. A sensing apparatus comprising:
    (a) a plurality of sensing devices, wherein each sensing device comprises:
        (i) an elongated whisker element having a deflectable cantilever region and a base region where a change in moment or curvature is generated by deflection of the cantilever region, and
        (ii) one or more sensor elements cooperatively associated with the whisker element to provide one or more outputs that is/are representative of a change of two orthogonal components of moment, $M_y$ and $M_z$, exerted at the base region;
    (b) a fluid flow source to direct fluid toward the plurality of sensing devices; and
    (c) a computer device to determine a fluid velocity profile using the one or more outputs of the plurality of sensing devices.

5. The sensing apparatus of claim 4, wherein the plurality of sensing devices are arranged in an array to determine fluid velocity profile along at least one dimension or axis.

6. The sensing apparatus of claim 5, wherein each sensing device comprises whisker elements of different lengths arranged in a bundle.

* * * * *